United States Patent Office 3,332,060
Patented July 18, 1967

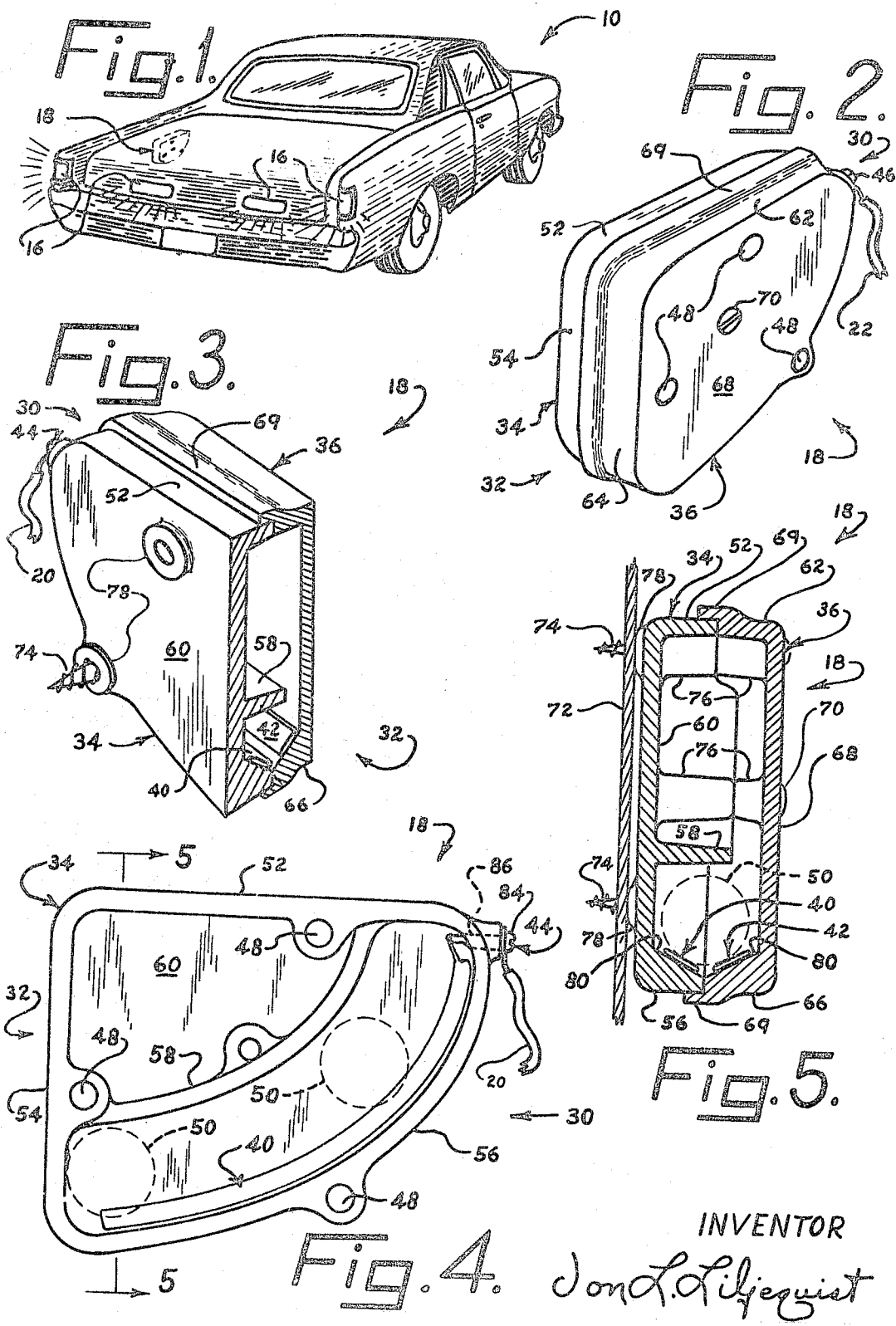

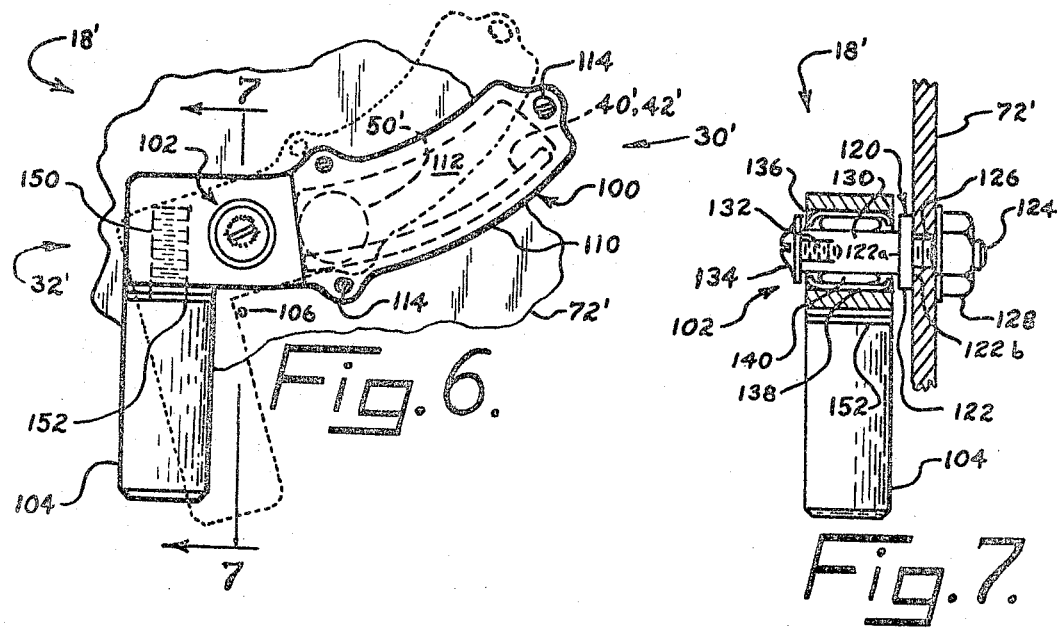

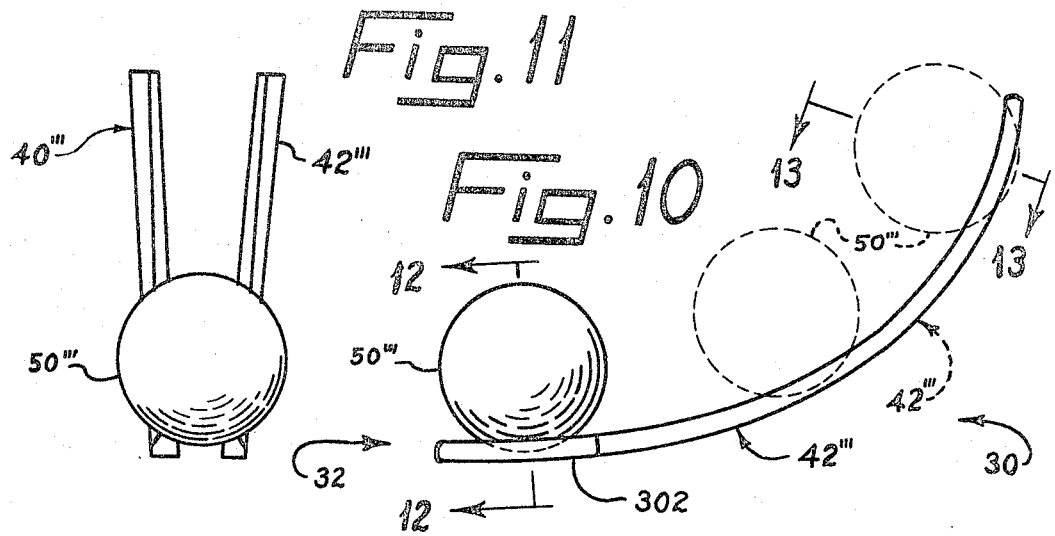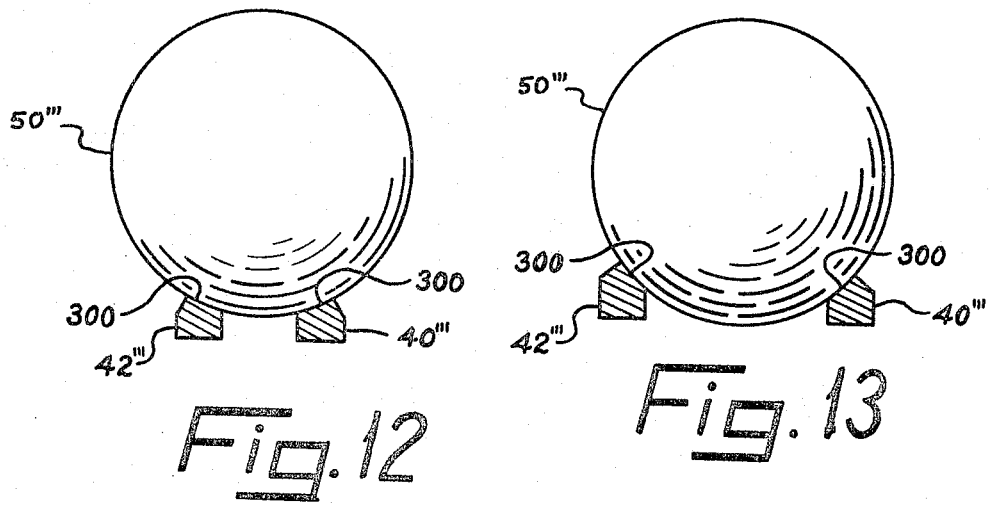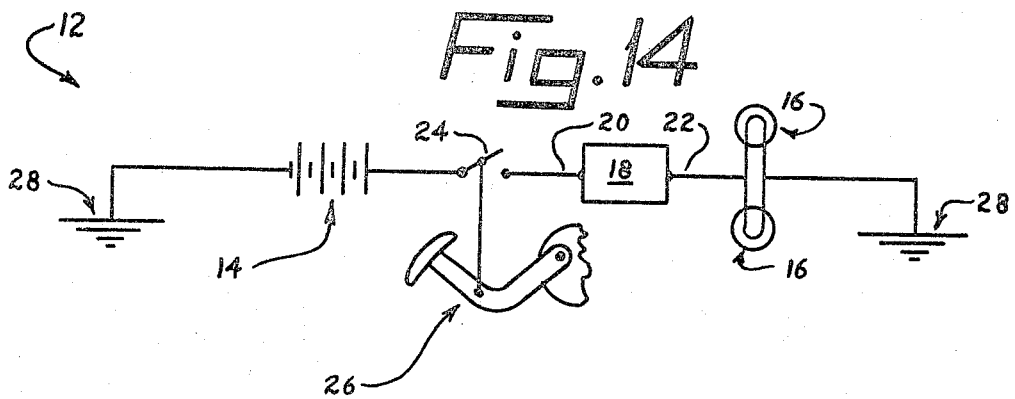

3,332,060
VEHICLE DECELERATION SIGNALLING
APPARATUS
Jon L. Liljequist, Arlington Heights, Ill.
(801 S. Elmhurst Road, Mount Prospect, Ill. 60056)
Filed June 30, 1964, Ser. No. 379,080
18 Claims. (Cl. 340—71)

ABSTRACT OF THE DISCLOSURE

A deceleration sensitive arrangement for varying the current flow in an electric circuit and being of a type utilizing a relatively freely movable mass forming an electrical bridge between two terminals in the circuit of which at least one comprises an elongate track, the mass being biased toward a specific position relative to the track and being movable relative thereto responsive to changes in velocity, and electrical resistance so arranged as to vary the electrical resistance interposed in the circuit dependent upon the relative position between the track and the mass.

---

This invention relates to a method and apparatus for indicating the velocity-changing characteristics of a moving object, and more particularly, to an intertia actuated switching device and system responsive to changes in deceleration of a vehicle for varying the amount of light emitted from its rear warning lights.

Most land vehicles in use today incorporate a brake light system which is actuated by the operator of the vehicle upon depressing the brake pedal, as a warning to following vehicles. Unfortunately, present brake light systems frequently mislead following drivers because the brake light intensity is the same for all rates of deceleration, and therefore, the driver behind has no way of knowing if the preceding car is coming to a gradual or sudden stop. This problem has particular significance in cities or on modern expressways during rush hours when automobiles are closely spaced. An abrupt stop after a number of intermittent gradual stops frequently catches the driver behind unaware, inasmuch as he may become conditioned to expect a slow stop by the previous conduct of the preceding vehicle. Furthermore, most modern automobiles are equipped with automatic transmissions which permit operation of the vehicle with only two foot pedals, the brake and the accelerator. Many drivers have fallen into the habit of "riding the brake," especially in traffic where driving conditions are slow, and this method of driving (with one foot lightly depressing the brake pedal) may cause the brake lights to remain on continuously thereby rendering them ineffective for their intended purpose.

It has been suggested that a rheostat system might be connected between the brake light electrical system and the hydraulic brake system of an automobile which would act to vary the intensity of the brake lights responsive to the amount of pressure exerted on the brake pedal. This method of overcoming the constant-intensity brake light problem has many disadvantages. For example, the system is not readily adaptable to the brake systems of automobiles already on the road, and it requires substantial modification of current brake systems as well as installation by a skilled mechanic or at the automobile manufacturer's factory. Also, the introduction of more connections and mechanism into a hydraulic brake system increases the possibility of brake failure. Furthermore, the systems suggested are fairly complex and therefore expensive. In addition to the above, such a system does not give a uniformly reliable indication of deceleration because more pressure is required to be applied to an old set of brakes than a new set, and this type of system cannot compensate for the changing condition of the brakes in one vehicle or variations between brakes in different vehicles. Similarly, the system is not reliable in that it cannot compensate for the condition of the roads. When a road is slippery, the amount of pressure applied to the brakes may have no relation to the rate of deceleration of the vehicle, and the bright light from the brake lights may cause the following driver to panic without cause. Still another disadvantage of this system is that it is only adaptable to a vehicle having a conventional hydraulic braking system.

A general object of this invention is to provide a new and improved velocity-change detector for use on a moving object.

Another general object of this invention is to provide a new and improved warning system for a vehicle.

An advantage of the invention is the provision of a warning system adapted for use on any type of vehicle whether operated on land, on water, or even in the air.

A feature of the invention is the provision of a new and improved warning system for a vehicle including an intertia actuated mass wherein the mass is made of electrically conductive material having low resistive properties in some forms of the invention and higher resistive properties in other forms thereby providing flexibility in the design of a variable resistance system.

Another feature is the provision of a system for use in a vehicle warning system including a mass movable over a track wherein the track may include electrically resistive material designed to cooperate with the mass to vary the resistance in an electrical circuit.

One variation of the invention includes the feature of a system for varying the current flow in a vehicle warning signal, the system including an intertia actuated mass movable responsive to the deceleration of the vehicle, and also including leveling means to compensate for any error incurred due to inclination of the vehicle's path.

An advantageous feature of another variation of the invention is the use of a pair of parallel tracks as electrical terminals of which at least one also includes an electrical resistance, said tracks being bridged by an electrically conductive mass which is movable responsive to the deceleration of the vehicle to vary the current in a circuit.

An advantageous feature of still another variation of the invention is a pair of elongate converging tracks which serve as terminals and are bridged by a mass movable in response to the deceleration of the vehicle, said mass including an electrically resistive material of the proper resistivity for varying the resistance between the terminals as the mass moves thereby varying the current in a read-out circuit.

A further advantage and feature of a modification of the invention is the provision of a warning light system which eliminates the necessity of a conventioal brake light switch in a vehicle as well as serving to vary the intensity of the vehicle's warning lights.

Other objects and advantages of the invention will become readily apparent from the following detailed description taken in conjunction with the accompanying drawings, in which:

FIG. 1 shows an automobile equipped with a brake light system including a device embodying the principles of the invention;

FIG. 2 is an outside perspective view of one form of the device showing the top, the rear, and one side thereof;

FIG. 3 is a perspective view of the same form of the invention from the other side having portions broken away to show portions of the inside in perspective;

FIG. 4 is a side view of the device with the cover removed;

FIG. 5 is a cross sectional view of the device shown in FIG. 4 taken substantially along the lines 5—5 of FIG. 4, and also showing a vertical panel to which the device may be mounted;

FIG. 6 is a side view of a variation of the device;

FIG. 7 is a cross sectional view taken substantially about the lines 7—7 of FIG. 6, and also showing the manner in which this variation is mounted;

FIG. 8 is a perspective view of still another variation of the invention with portions broken away to more clearly show the mechanism therein;

FIG. 9 is a cross sectional view of the device shown in FIG. 8 taken substantially about the lines 9—9 of FIG. 8;

FIG. 10 is a side view of a modified form of track usable in certain of the above described variations;

FIG. 11 is an end view of the tracks shown in FIG. 10;

FIG. 12 is a cross sectional view taken substantially along the lines 12—12 of FIG. 10;

FIG. 13 is a cross sectional view of the tracks taken substantially along the lines 13—13 of FIG. 10; and FIG. 14 shows one form of a circuit in which the invention is usable.

While several illustrative embodiments of the invention are shown in the drawings and will be described in detail herein, the embodiments illustrated are to be considered merely as variations of one preferred form of the invention. The invention is susceptible of many different forms, and it should be understood that the present disclosure is to be considered as an exemplification of the principles of the invention and is not intended to limit the invention to the general form illustrated or any of its variations. The scope of the invention will be pointed out in the appended claims.

Referring now to the drawings in more detail, and using like numbers primed for like parts throughout the several variations, the invention is shown for purposes of illustration in connection with a land vehicle 10 in FIG. 1; however, it will be understood that the invention may also be used with other moving objects including water and air supported vehicles. The vehicle is equipped with an electrical circuit 12 shown generally in FIG. 14 which includes a power source shown here in the form of a battery 14, one or more warning indicators shown here in the form of lights 16, a device 18 which acts as the main control unit for the invention and which is connected to otherwise disconnected lines 20 and 22 of circuit 12, and, if desired, a circuit breaking switch 24 which, in the case of a land vehicle, may be actuated by means of a foot brake 26. Although the circuit is shown as completed by a pair of ground leads 28, it will be appreciated that other methods of completing the circuit may be used. When the indicator takes the form of lights such as those in the vehicle illustrated, the warning lights may either operate on a separate light circuit or may be included as a part of the vehicle's general lighting system which may also include running lights. Also, if more than one bulb filament is used, they may be arranged to light up together or successively.

Referring now to the device or control unit 18 for the system, the simplest construction of the invention is shown in FIGS. 2-5. The device 18 has a front 30 and a rear 32 for alignment with the direction of motion of a carrier such as a vehicle; and consists generally of a pair of hollow, complementary shells or sections 34 and 36 which fit together to form a hollow enclosure; a pair of elongate tracks or terminals 40 and 42; terminal connection means as at 44 and 46 facilitating connection of the tracks with lines 20 and 22; means as at 48 to facilitate rigidly mounting the structure 18 to the vehicle; and mass means as at 50 movably mounted within the enclosure and bridging terminals or tracks 40 and 42.

Section 34 includes an elongate and generally horizontal upper wall 52, a rear upright wall 54 connected to the upper wall at its upper end, a lower concave wall 56 opening upwardly and connecting the rear and upper walls at their lower and front ends respectively, an intermediate curved wall 58 generally parallel to lower wall 56 and connecting walls 52 and 54 near their mid-portions, and a front to rear extending vertical side wall 60 connecting walls 52, 54, 56 and 58 to form a sectioned shell opening outwardly and to the side. Section 36 is of generally similar configuration and includes an elongate and generally horizontal upper wall 62, an upright rear wall 64, a lower curved wall 66 opening upwardly and connecting lower portions of wall 64 and forward portions of wall 62, and an outwardly disposed and vertical side wall 68 connecting walls 62, 64, and 66 at their common edge portions to form a shell of mating and complementary shape to shell 34. Alignment of the two shells together to form a hollow enclosure is facilitated by means of a lip 69 formed integrally with walls 62, 64 and 66 of section 36, the lip 69 extending annularly around section 36 and outwardly therefrom to grip the outer edges of mating walls 52, 54 and 56 of section 34. Upper walls 52 and 62 are designed to lie horizontally when the device 18 is properly mounted to facilitate leveling of the device during mounting, for reasons to become apparent later. Shells 34 and 36 are secured together by a single screw 70 before mounting to the vehicle and are then more rigidly fastened together and also to a vertical wall 72 forming part of the vehicle by means of fasteners, here shown as three self-tapping screws 74. Crushing of the device 18 under the compression of screws 70 and 74 is prevented by providing backing material as at 76 around the fastener holes within shells 34 and 36; and three tabs as at 78 are provided on the exterior side of wall 60 to insure a flat and unobstructed mounting of the device to vehicle wall or surface 72.

The sections 34 and 36 are preferably molded of a nonconductive material, such as bakelite, to prevent short-circuiting, and to permit the holes 48, backing material 76, and mounting tabs 78 to be finish molded in one operation.

Inner surfaces 80 of lower walls 56 and 66 are inclined to form a V when viewed in a vertical and transverse cross section, as can be seen in FIGS. 3 and 5, to form a supporting base for tracks 40 and 42. Tracks 40 and 42 comprise a pair of substantially parallel terminals or terminal extensions for the circuit 12, and they curve upwardly toward the front end 30 of the device 18 so as to form an upwardly opening concave path over which the mass 50 may roll. Although made of electrically conductive material, at least one of the tracks 40 or 42, here shown as 40, includes or entirely consists of an elongated resistance element. Each of the tracks 40 and 42 are connected at their forward end to lines 20 and 22 respectively of the electrical circuit 12 by terminal connection means 44 including a screw 84 and a conductive threaded receiver 86, each receiver 86 extending through a different section and being connected to one of the tracks.

The construction of the resistive track 40 may take several forms of which two will be described here. One method of making the track when the device is used in a brake light system is to make it entirely of an electrically resistive material in the shape of a wire or strip attached to or embedded in the lower and inner portions of their supporting structure 18. The tracks 40 and 42 may be held on surfaces 80 in spaced apart relationship by a suitable bonding material such as cement. A modification of the tracks involves laterally striping one with a dielectric material such as a suitable paint so as to cause mass 50 to only intermittently touch the conductive portions of the tracks on its movement therealong to cause flickering of the brake light as well as variable intensity when the device is used in a brake light system, as will become apparent later. In the case of a 12 volt D.C. automative circuit including a single 1034 dual filament brake light bulb, satisfactory results are obtained by using a resistance over the entire length of track of about 5 ohms. Where more than one bulb is connected in parallel, an inversely proportional value of resistance provides the same intensity output per bulb. The brake light filament of a 1034 bulb has a room temperature resistance of about ⅔ ohm, the resistance increasing to about 6⅔ ohms at operating temperature when connected to a 12 volt automobile battery. Such bulks are available from various manufacturers such as Tung-Sol Electric Company of Newark, New Jersey. Because it is desirable to provide more light than these bulbs normally emit, several bulbs may be connected in parallel.

The mass 50 consists generally of a sphere made entirely of or plated with electrically conductive material, and is free to roll along tracks 40 and 42, being biased to its rear and lowermost position by gravity. As will be understood, sphere 50 forms a movable electrical bridge between the terminals 40 and 42. Mass 50 may also be thought of as a movable terminal, especially where one track comprises the resistance element and both the other track and the mass are low resistance conductors. Although sliding or swinging masses may be used, a rolling mass is herein shown because of its relatively free movement and inherent simplicity.

In mounting the device 18, assuming it is already assembled with mass 50 in place and sections 34 and 36 secured together by screw 70, it is held up against a vertical wall or panel 72 of the vehicle, and then leveled by placing a level along upper wall 62 or lip 69. A suitable marking tool may be inserted through holes 48 to locate drill centers on panel 72. Device 18 is temporarily removed for the purpose of drilling the located holes, and is then fastened to wall 72 by self-tapping screws 74. Leads 20 and 22 are then connected to terminals 40 and 42 as by screws 84. Leveling of the device insures that the rear and lower portions of tracks 40 and 42 will initiate in a forward direction at a slight incline to insure proper functioning thereof, to be described next.

In operation, and assembling the device is installed in a conventional land vehicle having a conventional brake switch, when the operator depresses brake pedal 26 sufficient to close switch 24, but insufficient to cause any appreciable deceleration of the vehicle, mass 80 remains in its rearmost position because its tendency to roll forwardly is not sufficient to overcome the slight initial incline of the tracks, and resistance track 40 interposes sufficient electrical resistance in the circuit to permit the brake lights to emit only a normal amount of warning light. However, with more braking of the vehicle, the inertia of the mass 50 overcomes the incline and carries it forwardly over tracks 40 and 42, the tracks 40 and 42 being rigidly affixed relative to the vehicle, and therefore being constrained to decelerate therewith. Because the mass 50 is biased downwardly by gravity, and because of the curving incline of tracks 40 and 42, the degree to which it is carried forwardly and upwardly is a function of the rate of deceleration of the vehicle. The position of the mass on the tracks determines the amount of electrical resistance interposed between the lines 20 and 22, and the amount of resistance in the circuit determines the current flow, the current flow governing the intensity of the light emanating from the brake lights when brake lights are used as the indicating means. It can thus be seen that the amount of light emitted by the brake lights will vary responsively to the deceleration of the vehicle. By attaching one of the lines 20 or 22 to the front end of resistance terminal 40, the brake lights will increase in intensity with increasing deceleration.

Wall 58 of section 34 is spaced slightly above the top of mass 50 and acts as a retaining wall to prevent mass 50 from jumping appreciably away from the tracks when the vehicle is jarred, thereby diminishing the possibility of injury to the tracks.

FIGS. 6 and 7 show a variation of the invention hereinbefore described and illustrate a method by which the controlling device 18 may be mounted to inherently compensate for any error in brake light intensity that might be caused because of the inclination of the vehicle over its path. For example, if the preceding low-cost form, as illustrated in FIGS. 2–5, were used on a vehicle traveling over mountainous terrain, and if the vehicle were moving down a steep incline, the mass 50 would roll to the then lowermost point on tracks 40 and 42 causing the brake light to glow with a greater intensity than would be expected from a slight braking of the vehicle. In order to compensate for the inclination of the vehicle, the control device 18' of the variation to be described is pivotally mounted to the vehicle and has a center of gravity offset from the pivotal mounting so that the device will always hang properly oriented relative to the horizontal during substantially constant velocity operation of the vehicle.

Referring more specifically to FIG. 6, the device 18' consists generally of a track supporting and electrical resistance containing portion 100 shown at the upper right (this portion containing the mass 50'), generally centrally located pivotal mounting means 102, and counterweight means 104 shown at the lower left hand portion of the illustration. The device is also characterized by a center of gravity 106 offset from pivotal mounting means 102 to insure proper orientation of the track supporting portion 100 and associated mechanism.

Track supporting portions 100 are constructed to perform the same function as the comparable portions of the variation shown in FIGS. 2–5 and include a hollow and sidewardly opening main body portion 110, a side cover plate 112 affixed to body 110 as by screws 114 to form a hollow enclosure, parallel and upwardly concave tracks 40' and 42' mounted on the inner lower portions of the enclosure, movable mass 50' carried on and bridging said tracks, and means (not shown) facilitating connection of the tracks 40' and 42' at their upper forward end to lines 20 and 22 of the electrical circuit. The connection between lines 20 and 22 and tracks or terminals 40' and 42' may take the form of a pair of loosely hung wires originating near the mounting of the device to the vehicle and flexibly extending to the front end portions of the tracks 40' and 42'.

FIG. 7 shows in greater detail the mounting means 102 for the device, the mounting means consisting generally of a mounting lug 120 having a centrally located and relatively large diameter portion 122 forming a first shoulder 122a and a second shoulder 122b abutting a side panel 72' of the vehicle a threaded portion 124 extending from shoulder 122b through a hole 126 in the side panel 72' for receiving a securing nut 128, and a cylindrical portion 130 extending outwardly from shoulder 122a and having a tapped hole 132 in its outermost end which receives a retaining screw 134. Device 18' has a hole 136 extending transversely therethrough into which is pressed outer race 138 of a complement of needle bearings 140, the latter providing a low pivotal resistance mounting. It will be understood that the device 18' is free to rotate on cylindrical portion 130 but is constrained from appreciable lateral movement by virtue of retaining screw 134 and shoulder 122a.

Counterbalance 104 is shown here as a cylindrical depending weight threadably secured in the main body of the device as at 150. Counterweight 104 may take the form of a separate piece, as shown here, or may be formed integrally with the body of the device, it being understood that its primary purpose is to provide a center of gravity for the entire device somewhat offset from the pivotal mounting means 102. The counterweight as shown is designed and located to insure that the rearmost portions of the tracks 40' and 42' within portions 100 initiate forwardly at a slight incline, and some adjustment in the position of center of gravity 106 is available by varying the number of washers 152 between the main body and threaded portions of counterweight 104. Adjustment of the center of gravity relative to the device 18 provides variable sensitivity, as will be apparent.

It can be seen that the device is easily mounted by inserting threaded portions 124 of lug 120 through hole 126 in panel 72 and securing it thereagainst by means of nut 128. Device 18' is then slipped over cylindrical portions 130 and retaining screw 134 is screwed into place. Leads 20 and 22 are then attached to the tracks to complete the mounting.

In operation, and assuming the vehicle is moving at a constant speed, the device will always keep itself level by virtue of its pivotal mounting and offset center of gravity regardless of the incline of the vehicle. However, when the vehicle decelerates, the center of gravity 106 swings forwardly causing device 118 to pivot in counterclockwise fashion as viewed in dotted lines in FIG. 6. At the same time, mass 50' similarly tends to roll forwardly due to its own inertia while the tracks on which it rests swing upwardly and rearwardly relative to the pivotal mounting 102. The result is that the mass rolls up the inclined tracks thereby diminishing the resistance between lines 20 and 22 and causing a change in total resistance of the circuit 12.

It will be appreciated that the features of the latter described variation may be incorporated into other of the variations described hereinbefore and hereinafter.

FIGS. 8 and 9 show still another variation of the invention wherein the movable mass 50" is in the form of a cylinder which is movable over a substantially horizontal and converging pair of tracks 40" and 42", the cylinder 50" being biased toward the rear end 32" of the device 18" by means of a spring. In this variation, the mass 50" includes the circuit resistance rather than one or both of the tracks 40" and 42", although they may carry supplemental resistance if desired. Another feature is the provision of a sensitivity adjustment to be described in greater detail hereinafter.

In general, the device 18" includes a housing 200 in the form of a rectangular parallelopiped including a lower section 202 and an upper section 204, a pair of electrically conductive and forwardly converging tracks 40" and 42", a movable mass 50", means 206 for biasing the mass toward the rear end 32" of the housing, means 208 for connecting the tracks to the lines 20 and 22 of circuit 12, means 210 pivotally mounting the housing to the vehicle, and adjustable means 212 for leveling the housing and for varying the sensitivity of the device.

Converging tracks 40" and 42" in this variation are molded integrally into the molded lower housing portion 202, and are made of electrically conductive material. Resting on the tracks 40" and 42", and contained within the housing, is a cylindrical rolling mass 50" comprising the resistance element comparable in function to track 40 of the above described variations. Mass 50" is preferably made of a suitable semiconductive material providing the proper range of resistance for the specific circuit. As will be understood, when the mass 50" rolls toward the front end 30" of the device, the distance mass 50" bridges between terminals 40" and 42" is decreased, and inasmuch as the circuit's electrical resistance varies with the distance bridge by the electrically resistive mass, the resistance in circuit 12 is diminished.

Mass 50" is biased to the rear end 32" of the housing, corresponding to its high resistance position, by biasing means 206 which includes a U-shaped yoke 214 having arms 216 extending around the sides of mass 50 and pivotally connected thereto as at 218. An elongate spring guide 220 is fixedly attached to yoke 214 as at 222, and extends generally horizontally and forwardly into a guide sleeve 224 provided at the front end of the housing. Mounted between yoke 214 and sleeve 224 is a helical compression spring 230 which is preloaded with a small compressive force for biasing mass 50" toward its rearmost position, the bias of spring 230 increasing as mass 50" moves forwardly.

It can thus be seen that the relatively freely movable mass 50" will very its position along tracks 40" and 42" in a forward and rearward position dependent upon the deceleration of the vehicle, resisted in its movement only by spring 230, and this movement effects a change in total resistance in the circuit.

This variation, as shown in FIGS. 8 and 9, also includes a combined leveling and sensitivity adjustment in the form of means 210 and 212. Means 210 comprises a pair of spaced apart hinges each having an upper leaf 234 mounted to lower housing 202, a lower leaf 236 mounted to a generally horizontal portion of the vehicle, and a pin 238 pivotally connecting the leaves together. Means 212 comprises a vertical adjustment for the other end of housing 200, here attached at rear end 32", and includes a bracket 240 secured to the vehicle as at 242 and having rigidly fixed thereto an upright screw 244, an L-shaped bracket secured to housing portion 200 by fastening means 248, the screw 244 extending through a hole 250 in the outwardly extending leg 252 of bracket 246 to permit vertical adjustment of the rear end of the device 18 as by nuts 254.

Means 210 and 212 can be used to level the device 18" after it is mounted on a non-horizontal surface, or alternatively, the tracks can be made to incline upwardly toward the front or upwardly toward the rear, this adjustment providing an adjustment of the sensitivity of the movable mass 50". For example, increased sensitivity is provided by raising the rear end 32" by means of adjustment 210 which would incline the tracks from front to rear, thus causing a portion of the weight of mass 50" to be supported by the spring 230. This adjustment will tend to negative the preload in the spring; and therefore, a slight deceleration of the vehicle would cause the spring 230 to be less influential in overcoming the inertia of mass 50" than if the device 18" were level or sloped in the other direction, the latter adjustment tending to diminish sensitivity. An alternative technique would be to provide an adjustment for directly varying the preload in the spring as by further extending or compressing it. It will be understood that comparable means for varying sensitivity may be incorporated into other variations of the invention.

FIGS. 10–13 show a modified form of tracks 40 and 42 for use in the invention which are particularly useful when a spherical mass is used and the spherical mass is the resistance element in the circuit, although an electrically resistive track may also be used with either a conductive or resistive mass herein.

As can be seen in FIG. 10, the tracks 40''' and 42''' are curved upwardly and forwardly to provide an upwardly concave support for the mass 50''' thereby providing a gravity biased system. FIG. 11 shows the diverging character of the tracks similar to the variation shown in FIGS. 8 and 9 providing a variable distance bridge between the tracks or terminals. As can be seen in FIGS. 12 and 13, the tracks 40''' and 42''' include mass supporting surfaces 300 which are arcuately curved in cross section to provide good electrical contact with the bridging mass 50'''. An advantage of this form of track resides in the fact that the tracks are close together at the lower rear end of the device where the mass is normally disposed, thereby providing a substantial lower support for the mass as well as a relatively high degree of deceleration sensitivity. As the mass moves forwardly during deceleration of the vehicle, it also sinks lower between the tracks diminishing the sensitivity and lessening the chance of the mass hitting the inside upper end of the housing (not shown) in which the tracks are carried. Furthermore, the mass will have a greater tendency to hang in its elevated position after a rapid deceleration of the vehicle because of its decreased sensitivity in this position, thereby providing additional warning to persons therebehind.

The tracks or terminals may also be modified slightly to act as a switch thereby eliminating the necessity of a conventional brake light switch in the case of ordinary land vehicles. For convenience, the modification is shown in conjunction with FIG. 10 in which the lower and rearmost portions of one or both of the tracks as at 302 may be made of a nonconductive material. When the tracks are made in this way, the device 18 acts not only as the control unit for a variable intensity brake light system, but also acts to turn on the brake lights responsive to the movements of the vehicle rather than to depression of the brake pedal by the operator. This modification completely eliminates the annoyance and hazard caused by those drivers who drive with one foot on the brake thereby causing the brake lights to glow constantly.

Although the invention has been shown in one general form having several variations and modifications, it will be understood that the essence of the invention can be reproduced in other forms appearing considerably different. Using the broad principles of the invention hereinbefore described, it would be relatively simple for one skilled in the art to incorporate these teachings into a more complex brake light circuit to vary the brake light intensity.

The teachings herein disclosed are also to be understood as readily adaptable to devices for measuring acceleration as well as deceleration, and even both acceleration and deceleration might be measured by the same control unit.

Advantages residing in any one or more of the variations shown are not to be construed as restricted thereto; and also, the invention is not to be limited merely to the illustrations described hereinabove disclosing a preferred form and variations, but rather by the scope of the appended claims.

I claim:

1. In combination with a vehicle including an electrical brake light circuit, a brake light control unit attached to said vehicle including a track supporting portion, a pair of elongate tracks carried by said track supporting portion and having an upper surface curved to open concavely upwardly, said tracks including electrically conductive material connected in said circuit, one of said electrically conductive tracks comprising an elongate resistor; and an electrically conductive spherical mass of a diameter greater than the distance between said tracks resting on and connecting said tracks to thereby electrically complete said circuit and permit current flow therein, said spherical mass being movable in response to changes in velocity of said vehicle thereby varying the electrical resistivity in said circuit and varying the amount of light emanating from the brake lights.

2. A variable intensity brake light system for a vehicle having front and rear portions, comprising: an electrical circuit carried by said vehicle and including a power source and a light source; and an inertia actuated switch in said circuit including a body portion having an electrically resistive element extending generally in a front to rear direction relative to said vehicle forming a terminal in said circuit, said element having a high circuit resistance portion and a lower circuit resistance portion, an electrically conductive mass having a round cross section adapted for rolling movement forwardly and rearwardly over said resistive element, said mass being in electrical contact with another terminal in said circuit, said mass also being biased towards said high circuit resistance portion and movable in a forward and rearward direction relative to said element in response to increasing and decreasing degrees of deceleration of said vehicle to thereby decrease and increase the resistance in said circuit and effect a change in the quantity of light emitted by said light source in a manner indicative of the degree of deceleration of the vehicle.

3. A variable intensity brake light system for a vehicle, comprising: a circuit adapted to be carried by said vehicle including a light source and a pair of spaced apart lines; a power source connected in said circuit; and a deceleration sensitive device adapted to be mounted on said vehicle and including first and second spaced apart electrically conductive tracks, said tracks being curved and opening concavely upwardly, each of said tracks being connected to a different one of said lines, and a generally spherical electrically conductive mass bridging said tracks and designed for rolling movement therealong responsive to the deceleration of said vehicle, one of said tracks and mass comprising an electrically resistive material providing varying degrees of resistance in said circuit dependent upon the longitudinal position of the mass on said tracks to alter the circuit characteristics thereby providing a brake light signal which varies in response to varying deceleration of the vehicle.

4. A device for detecting changes of velocity of a moving object and changing the current flow in a read-out circuit, comprising: a supporting structure adapted to be mounted on said object and including a pair of spaced apart and disconnected track-like electrical terminals adapted for connection in said circuit and aligned in the direction of movement of said object; mass means movably supported by said terminals for movement therealong responsive to changes in velocity of said moving object, one of said terminals and mass means comprising variable electrical resistance means for changing the electrical resistance in said circuit dependent on the relative position of said mass means on said terminals; and means biasing said mass towards a high resistance position on said terminals whereupon changes in velocity of said object causes relative movement between said terminals and said mass, thereby changing the current flow in said circuit.

5. A device adapted to be mounted on a moving object for varying the current flow in a circuit responsive to changes in velocity of said object, comprising; a body structure having means for attachment to said moving object; an elongate pair of spaced apart and electrically conductive track-like terminals carried by said body structure, said terminals being substantially parallel and each terminal curving upwardly in a generally vertical plane; means facilitating connection of said terminals in said circuit; and a mass having a circular cross section resting on and electrically bridging said terminals, said mass being movable over said elongate terminals by rolling responsive to changes in velocity of said object and assuming different elevational positions on said curved terminals dependent upon varying rates of velocity change; one of said track-like terminals comprising an electrical resistance arranged to interpose varying amounts of resistance in said circuit dependent upon the position of said mass relative to said terminals whereupon a change in velocity of said object varies the current flow in said circuit.

6. The device as defined in claim 5 wherein said attachment means includes leveling means.

7. The device as defined in claim 5 wherein said attachment means comprises a pivotal mounting and said device includes a center of gravity offset from said pivotal mounting whereupon said device remains level regardless of the inclination of said object.

8. The combination as set forth in claim 1, including means pivotally mounting said control unit to said vehicle about a horizontal axis, said pivotal mounting being spaced from the center of gravity of the control unit, for maintaining a degree of preferred orientation relative to the horizontal irrespective of the vehicle's inclination.

9. The combination as set forth in claim 1, wherein each of said tracks includes front portions and rear portions of which each is aligned in a generally front to rear direction relative to said vehicle, said rear portions initiating forwardly at a slight incline, said one track being attached into said circuit at said front portions, said unit including means supporting said mass in a rearmost position at said rear portions for readying said mass to move forwardly relative to said one track responsive to decreasing velocity of the vehicle.

10. The combination as set forth in claim 9, including insulating means separating said mass from said tracks when said mass is at its rearmost position for maintaining the circuit open.

11. The brake light system as set forth in claim 2, wherein said high circuit resistance portion forms the rearmost end of said element and slopes upwardly at a small angle in a forward direction, said element increasing in slope forwardly to said lower resistance portion, and means forming a part of said body portion for locating said mass at said high resistance portion during a non-decelerating condition of said vehicle whereupon the mass is prepared to move forwardly upon deceleration of the vehicle.

12. The brake light system as set forth in claim 2, wherein said body portion includes a center of gravity, and means pivotally mounting said body portion to said vehicle about a horizontal axis spaced from said center of gravity for causing said body portion to hang freely from said axis and counteract any deceptive output from the light source due to the inclination of the vehicle.

13. The brake light system as set forth in claim 3, wherein said device includes pivotal mounting means and a center of gravity offset therefrom for freely hanging said device from said pivotal mounting and for causing said device to be gravity biased toward a preferred orientation, said tracks being positioned above said center of gravity whereupon deceleration of the vehicle induces a relative displacement between said tracks and mass.

14. The brake light system as defined in claim 3, wherein said tracks have an upper surface which is concavely shaped in a plane generally perpendicular to their length to enhance the electrical connection between the tracks.

15. The device as set forth in claim 5, wherein said one track includes forward portions and rearward portions, said forward portions being connected into said circuit, said one track decreasing in slope rearwardly to said rear portions, means forming a part of said device for supporting the mass at said rearward portions, and means facilitating the properly aligned mounting of the device.

16. The device as set forth in claim 4, wherein said mass comprises said variable electrical resistance means, and wherein said spaced apart track-like terminals converge in the direction of movement of said mass means whereupon the current flow in said read-out circuit varies dependent upon the position of said mass means relative to said track-like terminals.

17. The device as set forth in claim 16, wherein said mass means includes semiconductive material.

18. An inertia actuated device adapted for mounting on a movable object and varying the current flow in a circuit responsive to changes in velocity of the object, comprising: a supporting body carrying an elongate and electrically resistive element forming a terminal in said circuit, said element having a high resistance portion and a low resistance portion, an electrically conductive mass freely movable longitudinally over said resistive element, said mass along being in electrical contact with another terminal in said circuit, means for exerting a bias on said mass and urging it toward said high circuit resistance portion, means forming a part of said main body for mounting same on said object with said resistive element aligned in a generally front to rear direction relative thereto whereupon changes in velocity of said object cause responsive movement of said mass longitudinally of said resistance element and effects a change in the current flow in the circuit, and means for adjusting the magnitude of the force exerted by said biasing means whereupon the sensitivity of the device to changes in velocity may be altered.

References Cited
UNITED STATES PATENTS

| | | | |
|---|---|---|---|
| 1,490,300 | 4/1924 | Wadsworth | 340—262 |
| 2,474,610 | 6/1949 | Wunsch | 340—262 |
| 2,547,199 | 4/1951 | Dezzani | 340—71 X |
| 2,851,568 | 9/1958 | Weiland | 338—44 |
| 3,073,922 | 1/1963 | Miller | 340—262 X |
| 3,108,252 | 10/1963 | Torres | 340—71 |

NEIL C. READ, *Primary Examiner.*

A. WARING, *Assistant Examiner.*